UNITED STATES PATENT OFFICE.

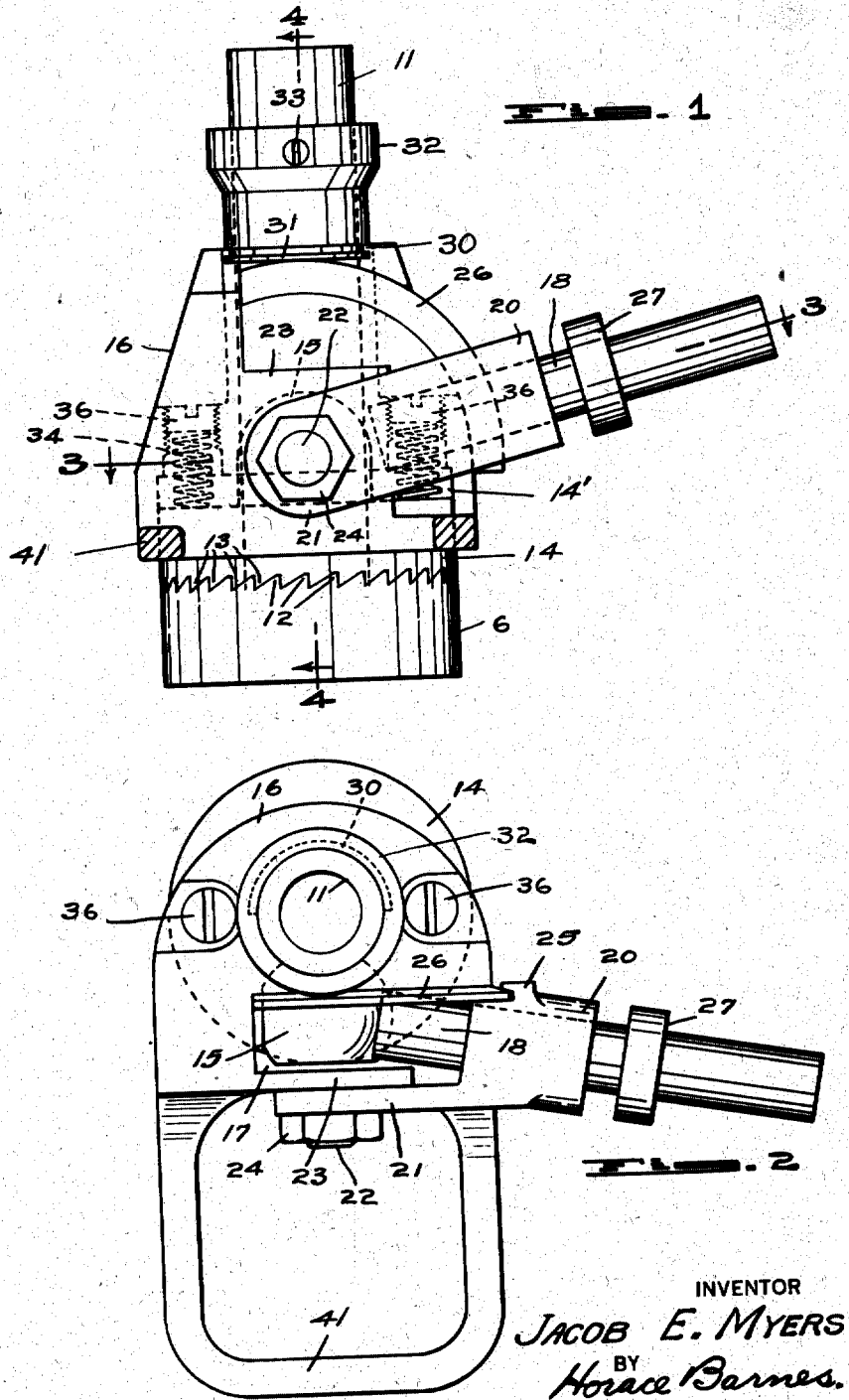

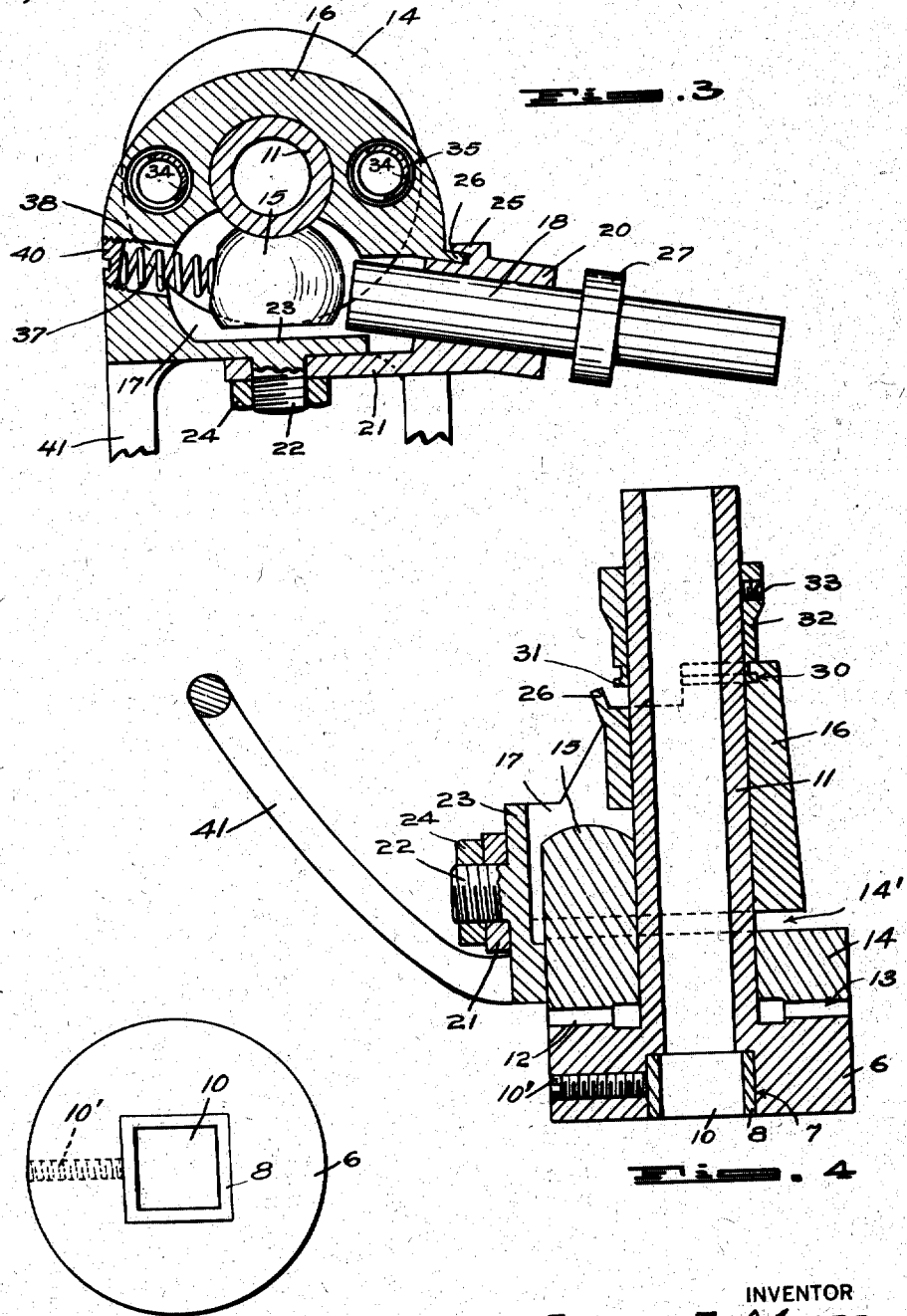

JACOB E. MYERS, OF SEATTLE, WASHINGTON.

NUT-TIGHTENING DEVICE.

1,302,830.  Specification of Letters Patent.  Patented May 6, 1919.

Application filed May 27, 1918. Serial No. 236,719.

*To all whom it may concern:*

Be it known that I, JACOB E. MYERS, a citizen of the United States, and resident of Seattle, in the county of King and State of Washington, have invented certain new and useful Improvements in Nut-Tightening Devices, of which the following is a clear and exact specification.

This invention relates to improvements in nut tightening devices and the object of this improvement is to provide a strong and efficient nut tightener that may be pneumatically operated and that will strike a blow that tends to drive the plates or members through which a bolt passes together at the same time that it exerts a turning force on the nut.

A further object is to provide a tool of this class wherein the direction of application of the hammer blows may be varied from an angle where substantially the entire force is exerted to turn the nut to a position where substantially the entire force is exerted to drive the plates or members through which the bolt passes together.

In tightening nuts on bolts that are used for bolting two or more plates or pieces of metal together it is often advantageous to strike the bolt or the plates and drive them together at the same time that a turning force is being exerted to screw on the nut.

This nut tightening device is constructed so that the blows of a pneumatic hammer or similar tool may be utilized to turn the nut on the bolt and at the same time to drive the plates or members through which the bolt passes together thereby making the nut turn more easily and making it possible to screw the nut down more tightly without injuring the thread of the bolt or nut than would otherwise be possible.

In the drawings Figure 1 is a view in side elevation of a nut tightening device constructed in accordance with this invention; Fig. 2 is a plan view of the same; Fig. 3 is a view in horizontal section substantially on broken line 3—3 of Fig. 1, certain parts being shown in elevation; Fig. 4 is a view in vertical section substantially on broken line 4—4 of Fig. 1; and Fig. 5 is an inverted plan view showing the nut engaging portion of the device.

Referring to the drawings throughout which like reference numerals designate like parts the numeral 6 designates a cylindrical base member that is provided on its bottom side with a centrally arranged recess 7 of square or other regular shape that is adapted for the reception of a nut or for the reception of a bushing 8 that in turn is provided with a central opening 10 which may be of square, hexagonal, octagonal or other similar shape and is adapted to be placed over a nut that is to be turned.

The bushing 8 may be removably held in place by a set screw 10' so that it may be taken out and replaced by a bushing having a nut-receiving recess of different size. In practice a different size of bushing will necessarily be provided for each size of nut that the tool is to be used upon except the largest size which may fit directly within the opening 7 if desired without the use of a bushing.

11 is a tubular shank that is integral or otherwise rigidly connected with the top side of the base 6 in a concentric position, and projects outwardly at right angles thereto thereby forming a stem or support for the remaining parts of the tool.

The shank 11 is necessarily hollow or tubular so that the end of a bolt may project upwardly thereinto as a nut is tightened thereon.

The top surface of the base member 6 is provided with a plurality of ratchet teeth 12 that are adapted to be engaged by a plurality of similarly constructed oppositely disposed ratchet teeth 13 on the bottom surface of a cylindrical driving member 14 the opposed ratchet teeth each preferably having one face arranged at substantially right angles to the plane of the surface of the member on which they are formed and the other face arranged at other than a right angle thereto so that when the driving member 14 is turned in a clockwise direction, as viewed in the drawings, it will rotate the base member along with it and when the driving member is turned in the opposite direction it will tend to ride over the teeth on the base member, in well known manner without turning the base member.

The driving member 14 is rotatably mounted on the shank 11 in concentric relation thereto and is provided on its top surface with a rounded lug 15 that is preferably constructed integral therewith and upon which the blows of the hammer may be delivered.

16 is a housing or casing that surrounds the upper portion of the shank 11 as more clearly shown in Figs. 3 and 4 and is recessed on one side as at 17 so that it will fit over the lug 15 and sufficient room will be left for the operation of a hammer tool 18.

The hammer tool 18 is slidably disposed within a sleeve or guide 20 that is provided with an outwardly extending lug 21 the end of which is pivotally mounted on a stud 22 on a flat extension 23 that is formed on one side of the housing 16.

The lip 21 is secured on the stud by a nut 24 and is so arranged as to permit the guide 20 to be oscillated through an angle of substantially ninety degrees.

The side of the guide 20 opposite the lug 21 is provided with a hook shaped member 25 that fits over an annular track section 26 that is formed on the housing 16 and thereby serves in conjunction with the pivot 22 to secure the guide 20 firmly to the housing 16 and at the same time permit oscillation of the guide 20 through an angle of substantially ninety degrees with respect to the housing.

The recess or bore in the guide 20 within which the hammer tool 18 reciprocates is inclined slightly as shown in Figs. 2 and 3 so that the outer end of the hammer tool will stand outwardly a sufficient distance to clear the shank 11 when the hammer tool is turned upwardly substantially parallel therewith.

The hammer tool 18 is provided with a collar 27 that is adapted to engage with the end of the guide sleeve 20 and limit the inward movement of the tool.

The upper end of the casing 16 on the side opposite the track section 26 projects above the other portion and is provided with an internal semi-circular recess 30 that extends substantially half way around the stem 11 and is adapted to fit over an external annular flange 31 on a collar 32 that is adjustably secured to the stem 11 by a set screw 33 so that the casing 16 is free to turn with respect to the stem 11 but is secured against vertical movement thereon.

In assembling the device the collar 32 may be inserted in the casing from the side adjacent the trackway 26, the casing and collar may then be slipped over the stem 11 and the set screw 33 tightened to secure the collar in the proper place.

The casing 16 will necessarily be spaced above the top of the driving member 14 as indicated at 14' to provide sufficient clearance for the driving member 14 to raise up a distance equal to the depth of the ratchet teeth as the teeth on the driving member 14 ride over the teeth on the base member 6.

The driving member 14 is yieldingly held in engagement with the base member 6 by springs 34 that are disposed within suitable recesses 35 in the housing 16 and bear upon the top surface of the driving member.

The recesses 35 preferably extend entirely through the housing 16 and have plugs 36 screwed therein to form adjustable stops for the ends of the springs as more clearly shown by dotted lines in Fig. 1.

37 is a compression spring that is disposed within a recess 38 in the housing 16 and is adapted to have one end abut against a flattened surface on one side of the lug 15 and the other end abut against a set screw or threaded plug 40 that is screwed into the outer end of the recess 38. The plug 40 forms a means of adjusting the compression of the spring 37 and may be quickly and easily removed to permit the spring to be taken out if desired.

After the lug has been driven forward by a blow of the hammer tool 18, the force of the spring 37 will move it rearwardly and cause the teeth on the driving member to ride over the teeth on the base member.

The tool may be provided with a handle 41 that may be formed integral with the casing 16 and may extend outwardly and upwardly from the base portion thereof as more clearly shown in Figs. 2 and 4.

This tool is particularly well adapted for tightening the nuts on bolts that are used for bolting plates together in the construction of large steel ships but it is obvious that it may be advantageously used in practically any construction where bolts and nuts are used.

In operation the bushing in the base member 6 is placed over a nut that is to be tightened, the outer end of the hammer tool 18 is inserted in the end of a pneumatic hammer of well known form, (not shown) and is actuated by the pneumatic hammer to deliver blows on the lug 15. When the hammer tool strikes the lug 15 the driving member 14, base member 6, and nut in the recess 10 will all be moved in a clockwise direction through an angle equal to or greater than the distance between two adjacent ratchet teeth and the spring 37 will be compressed as soon as the force of the hammer blow is spent the force of the spring 37 acting against the lug 15 will rotate the driving member 14 back into the position shown in Fig. 3, the ratchet teeth on the driving member riding over the ratchet teeth on the base member. When in use the base member will be securely pressed against the surface of the plates or members through which the bolt extends and will thereby be prevented from being turned rearwardly by the drag of the ratchet teeth of the driving member 14 as such member is moved back toward the tool member by the spring 37.

It will be obvious that as a hammer blow is delivered on the lug 15 it will not only tend to drive the members 14 and 6 around in a clockwise direction but will also tend to drive downwardly or endwise on such members thereby tending to drive the plates through which the bolt extends together at 13 the same time that it tightens the nut on the bolt.

The hammer tool 18 may be oscillated from a position substantially parallel with the flat faces of the members 14 and 6 to a position substantially at right angles thereto thereby varying the angle at which the blow of the tool is delivered and consequently varying the ratio between the effective turning force and the effective driving force that is derived from each blow.

For instance if the tool 18 is in a substantially horizontal position as shown in Fig. 1 almost the entire force of the blow will be exerted to turn the members 14 and 6 while if the tool 18 is turned into a substantially vertical position practically the entire force of the blow will be exerted as a driving force on the plates or members through which the bolt passes.

It is obvious that changes in the form of construction and arrangement of the various parts of this device may be resorted to within the scope of the following claims.

What I claim and desire to protect by Letters Patent is—

1. A nut tightening device of the class described comprising a socket adapted to fit over a nut, and means for delivering blows eccentrically on said socket and at such an angle that each blow tends to drive downwardly, at the same time exerting a turning force on said socket.

2. A nut tightening device of the class described comprising a socket adapted to fit over a nut, the surrounding edges of said socket being adapted to engage the surface against which said nut is to be tightened, and a hammer tool arranged to deliver blows eccentrically on said socket at an angle that tends to drive downwardly and at the same time tends to rotate said socket.

3. A device of the class described comprising a base member having a socket adapted to fit over a nut, and engage with the surface against which said nut is to be tightened, a driving member associated therewith, a housing, a hammer tool connected with said housing and adapted to be turned into various angular positions to strike blows on said driving member that tend to drive endwise and at the same time turn said driving member and ratchet means for converting oscillating movement of said driving member into rotary movement of said base member to turn a nut.

4. A nut tightening device comprising a base member having a centrally arranged socket adapted to fit over a nut, a hammer tool arranged to deliver blows eccentrically on said base member at an angle that tends to drive endwise and at the same time rotate said base member, and spring actuated ratchet means interposed between said base member and said hammer tool whereby said base member may be rotated by blows from said hammer tool without rotating said hammer tool.

5. A nut tightening device comprising a base member having a centrally arranged socket adapted to fit over a nut, a driving member rotatably mounted on the top of said base member, ratchet means for converting oscillating motion of said driving member into rotary motion of said base member, and a hammer tool adapted to be operated pneumatically to deliver blows eccentrically on said driving tool and at an angle that will tend to drive endwise on said driving member and also tend to turn said driving member.

6. A device of the class described comprising a base member having a socket on one side adapted to fit over a nut, a concentric hollow stem projecting outwardly from the other side of said base member, a driving member mounted on said hollow stem, ratchet means for converting oscillating movement of said driving member into rotary movement of said base member, a housing mounted on said stem, a hammer tool mounted on said housing and adapted to be turned into different annular positions to deliver blows on said driving member that tend to turn said driving member and at the same time to drive it endwise, and a spring for moving said driving member in a reverse direction to that in which it is moved by said hammer tool.

7. A nut tightening device of the class described comprising a cylindrical base member having a centrally arranged socket, a bushing adapted to be inserted in said socket said bushing being adapted to fit over a nut, ratchet teeth on the top side of said base member, an upwardly projecting cylindrical tubular stem concentrically secured to the top side of said base member, a cylindrical driving member mounted for rotation on said stem, ratchet teeth on the bottom side of said driving member and adapted to engage with said ratchet teeth on said base member, an eccentric lug on the top side of said driving member, a housing rotatably mounted on said stem, means for preventing vertical movement of said housing on said stem, a tool guide pivotally secured to said housing and adapted to be oscillated through an angle of substantially ninety degrees, a hook shaped extension on one side of said tool guide, an annular track way on said housing over which said hook shaped extension engages said trackway coöperating with the pivot of said tool guide to support said tool guide for oscillation, a tool reciprocable in said tool guide and adapted to strike blows on said lug to drive downwardly and at the same time exert a turning force on said base member, and a spring adapted to move the said driving member back toward said tool after the force of each blow is spent the ratchet teeth on the said driving member riding over the ratchet teeth on said base member.

8. A nut tightening device of the class described comprising a cylindrical base member having a centrally arranged socket, adapted to fit over a nut, ratchet teeth on the top side of said base member, an upwardly projecting cylindrical tubular stem concentrically secured to the top side of said base member, a cylindrical driving member mounted for rotation on said stem, ratchet teeth on the bottom side of said driving member and adapted to engage with said ratchet teeth on said base member, an eccentric lug on the top side of said driving member, a housing rotatably mounted on said stem, a tool guide pivotally secured to said housing, a tool reciprocable in said tool guide and adapted to strike blows on said lug to drive downwardly and at the same time exert a turning force on said base member the angle at which said blows are delivered depending on the position into which said tool is moved, a compression spring interposed between said housing and said lug to move said driving member toward said tool after the impact of each blow is spent, said ratchet teeth on said driving member riding over the ratchet teeth on said base member, and springs interposed between said housing and the top surface of said driving member to yieldingly hold said driving member in contact with said base member.

9. A nut tightening device of the class described comprising a cylindrical base member having a centrally arranged socket, a bushing adapted to be inserted in said socket said bushing being adapted to fit over a nut, ratchet teeth on the top side of said base member, an upwardly projecting cylindrical tubular stem concentrically secured to the top side of said base member, a cylindrical driving member mounted for rotation on said stem, ratchet teeth on the bottom side of said driving member and adapted to engage with said ratchet teeth on said base member, an eccentric lug on the top side of said driving member, a housing rotatably mounted on said stem, means for preventing vertical movement of said housing on said stem, a tool guide pivotally secured to said housing and adapted to be oscillated through an angle of substantially ninety degrees, a hook shaped extension on one side of said tool guide, an annular trackway on said housing over which said hook shaped extension engages said trackway coöperating with the pivot of said tool guide to support said tool guide for oscillation, a tool reciprocable in said tool guide and adapted to strike blows on said lug to drive downwardly and at the same time exert a turning force on said base member the angle at which said blows are delivered depending on the position into which said tool is moved, a compression spring interposed between said housing and said lug to move said driving member toward said tool after the impact of each blow is spent said ratchet teeth on said driving member riding over the ratchet teeth on said base member, and springs interposed between said housing and the top surface of said driving member to yieldingly hold said driving member in contact with said base member.

Signed at Seattle, Washington, this 20th day of April, 1918.

JACOB E. MYERS.

Copies of this patent may be obtained for five cents each, by addressing the "Commissioner of Patents, Washington, D. C."